(12) United States Patent
Jessop

(10) Patent No.: US 12,092,145 B2
(45) Date of Patent: Sep. 17, 2024

(54) PUSH-ON FASTENER

(71) Applicant: Cooper-Standard Automotive Inc., Northville, MI (US)

(72) Inventor: Stephen John Jessop, Plymouth (GB)

(73) Assignee: Cooper-Standard Automotive Inc., Northville, MI (US)

(*) Notice: Subject to any disclaimer, the term of this patent is extended or adjusted under 35 U.S.C. 154(b) by 698 days.

(21) Appl. No.: 17/199,939

(22) Filed: Mar. 12, 2021

(65) Prior Publication Data

US 2022/0243757 A1     Aug. 4, 2022

Related U.S. Application Data

(60) Provisional application No. 63/145,476, filed on Feb. 4, 2021.

(51) Int. Cl.
    *F16B 37/08*       (2006.01)
    *F16B 21/20*       (2006.01)
    *F16B 37/02*       (2006.01)

(52) U.S. Cl.
    CPC .......... *F16B 37/0842* (2013.01); *F16B 21/20* (2013.01); *F16B 37/02* (2013.01)

(58) Field of Classification Search
    CPC ....... F16B 37/0842; F16B 37/02; F16B 21/20
    See application file for complete search history.

(56) References Cited

U.S. PATENT DOCUMENTS

| | | | |
|---|---|---|---|
| 3,362,280 A | 1/1968 | Muller | |
| 3,712,655 A | 1/1973 | Fuehrer | |
| 3,871,430 A | 3/1975 | Meyer | |
| 4,299,520 A * | 11/1981 | Iwata | F16B 37/0842 411/259 |
| 4,318,498 A * | 3/1982 | Magers | B67D 1/10 285/902 |
| 4,632,608 A | 12/1986 | Blomberg et al. | |
| 4,728,236 A * | 3/1988 | Kraus | F16B 37/0842 411/525 |
| 4,780,037 A | 10/1988 | Payne | |

(Continued)

FOREIGN PATENT DOCUMENTS

| | | |
|---|---|---|
| DE | 3506196 A1 | 8/1985 |
| DE | 8711730 U1 | 11/1987 |

(Continued)

OTHER PUBLICATIONS

"Search Report for COO045-EP dated Jun. 10, 2022".

*Primary Examiner* — Robert Sandy
*Assistant Examiner* — Rowland Do
(74) *Attorney, Agent, or Firm* — Paschall & Associates, LLC; James C. Paschall; Anthony Miologos

(57) ABSTRACT

A push-on fastener for engagement on a cylindrical stud includes a body having oppositely facing first and second exterior surfaces and an outer marginal periphery. A central opening extends axially through the body between the oppositely facing exterior surfaces defining an inner periphery. A first resilient tab includes a first engagement edge and a second resilient tab includes a second engagement edge. The first engagement edge defining an inner periphery of the central opening and the second engagement edge defining a periphery that is outwardly of the inner periphery of the central opening.

12 Claims, 2 Drawing Sheets

(56) References Cited

U.S. PATENT DOCUMENTS

| | | | | |
|---|---|---|---|---|
| 4,859,129 | A * | 8/1989 | Kraus | F16L 3/237 |
| | | | | 411/908 |
| 4,911,594 | A | 3/1990 | Fisher | |
| 5,098,242 | A | 3/1992 | Schaty | |
| 5,106,223 | A | 4/1992 | Kraus | |
| 5,195,860 | A | 3/1993 | Steyn | |
| 5,291,639 | A | 3/1994 | Baum et al. | |
| 5,782,597 | A | 7/1998 | Meyer | |
| 5,833,422 | A | 11/1998 | Haga et al. | |
| 6,220,806 | B1 | 4/2001 | Chapman et al. | |
| 7,059,022 | B2 * | 6/2006 | Yuta | F16B 19/008 |
| | | | | 24/297 |
| 7,066,701 | B2 | 6/2006 | Kovac | |
| 7,182,563 | B2 * | 2/2007 | Wimmer | F16B 37/041 |
| | | | | 411/174 |
| 7,818,940 | B2 * | 10/2010 | Herb | F16B 43/001 |
| | | | | 411/533 |
| 8,328,488 | B2 | 12/2012 | Luk | |
| 8,979,461 | B2 | 3/2015 | Pearson | |
| 9,149,276 | B2 * | 10/2015 | Voss | A61B 17/10 |
| 9,309,033 | B2 | 4/2016 | Dorsey et al. | |
| 2009/0187215 | A1 * | 7/2009 | Mackiewicz | A61B 17/0057 |
| | | | | 264/177.17 |
| 2012/0035630 | A1 * | 2/2012 | Roorda | A61B 17/064 |
| | | | | 606/155 |

FOREIGN PATENT DOCUMENTS

| | | |
|---|---|---|
| FR | 2346592 A1 | 10/1977 |
| FR | 2382607 A1 | 9/1978 |
| FR | 2560941 B1 | 9/1985 |
| GB | 1149268 A | 4/1969 |
| JP | H07110082 B2 | 11/1995 |

* cited by examiner

PUSH-ON FASTENER

CROSS-REFERENCE TO RELATED APPLICATION AND PRIORITY CLAIM

This Application claims priority under 35 U. S. C. § 119(e) to U.S. Provisional Patent Application No. 63/145,476 filed on Feb. 4, 2021. This provisional application is hereby incorporated by reference in its entirety.

TECHNICAL FIELD

This disclosure is generally directed toward push-on fasteners. More specifically, this disclosure is directed to a push-on type metal fastener which can be axially forced into an engaged position on a stud.

BACKGROUND

Typically, a push-on fastener is used in conjunction with cylindrical posts or studs. The push nut has a hole or gripping opening for receiving the stud. The gripping opening typically includes a plurality of blades or teeth extending into the gripping opening for contacting and securing to the stud. The blades of the gripping opening typically form a shape like a truncated cone. These teeth are constructed in such a way that the push nut easily slides onto the stud but is very difficult to slide in the opposite direction or remove. Normally, the fasteners are installed by hand using simple manually manipulated tools. Conventional push-on fasteners typically include a single hole or gripping opening formed therein of a diameter to be installed over a specific fixed diameter stud or a stud having a varying diameter along its length. A gripping opening having a single fixed diameter can only accommodate a stud of a single diameter. That is, a different push-on fastener would be required for each specific diameter of stud. Additionally, if the stud is manufactured with anon-uniform diameter, an excessive force may h required to push-on and install the fastener where the diameter of the stud is larger than the gripping opening. On the other hand, when the diameter of stud is smaller than the gripping opening the fastener can easily be stripped off the stud due to the gripping opening not making sufficient contact with the stud. Therefore, a push-on fastener is desirable which can accommodate studs of different diameters or a stud of a non-uniform diameter.

SUMMARY

This disclosure is directed to a to a push-on type metal fastener which can be axially forced into an engaged position on a cylindrical stud.

In a first embodiment a push-on fastener for engagement on a stud is disclosed. The push-on fastener comprises a body having oppositely facing first and second exterior surfaces and an outer marginal periphery. A central opening extends axially through the body between the oppositely facing exterior surfaces defining an inner periphery. A first resilient tab includes a first engagement edge and a second resilient tab includes a second engagement edge. The first engagement edge defines the inner periphery of the central opening and the second engagement edge defines an outer periphery central opening that is outwardly of the inner periphery.

In a second embodiment a push-on fastener for engagement on a cylindrical stud is disclosed. The push-on fastener comprises a body having oppositely facing first and second exterior surfaces and an outer marginal periphery. A central opening extends axially through the body between the oppositely facing exterior surfaces defining an inner periphery. A first resilient tab includes a first engagement edge, and a second resilient tab includes a second engagement edge. The first tab is less resistant to deflection than the second tab.

In a third embodiment a method for forming a push-on fastener and installing the fastener on a cylindrical stud is disclosed. The method includes forming at least one first resilient tab including a first engagement edge and at least one second resilient tab including a second engagement edge from a body having oppositely facing first and second exterior surfaces. The method further includes forming a central opening extending axially through the body between the oppositely facing exterior surfaces and defining an inner periphery, the first engagement edge defining an edge of a first periphery of the central opening and the second engagement edge defining a second periphery of the central of the central opening that is outwardly of the inner periphery. The method also includes forming the first and the second engagement edges to extend obliquely of the body outwardly of the first exterior surface. The method discloses installing the fastener on the stud by inserting the central opening onto the stud from the body first exterior surface and forcing the body downward allowing the first engagement edge to engage the stud at a first location and the second engagement edge to engage the stud at a second location, the second location axially lower on the stud than the first location.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the disclosure may be implemented in any type of suitably arranged device or method.

Figure 3:
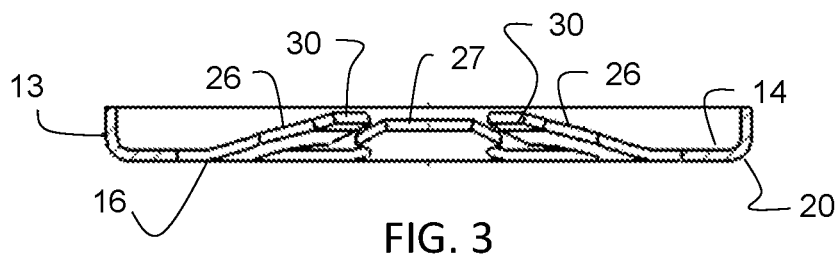
FIG. 3 illustrates a side sectional view of the push-on fastener along line 3-3 according to this disclosure.
Figure 1:
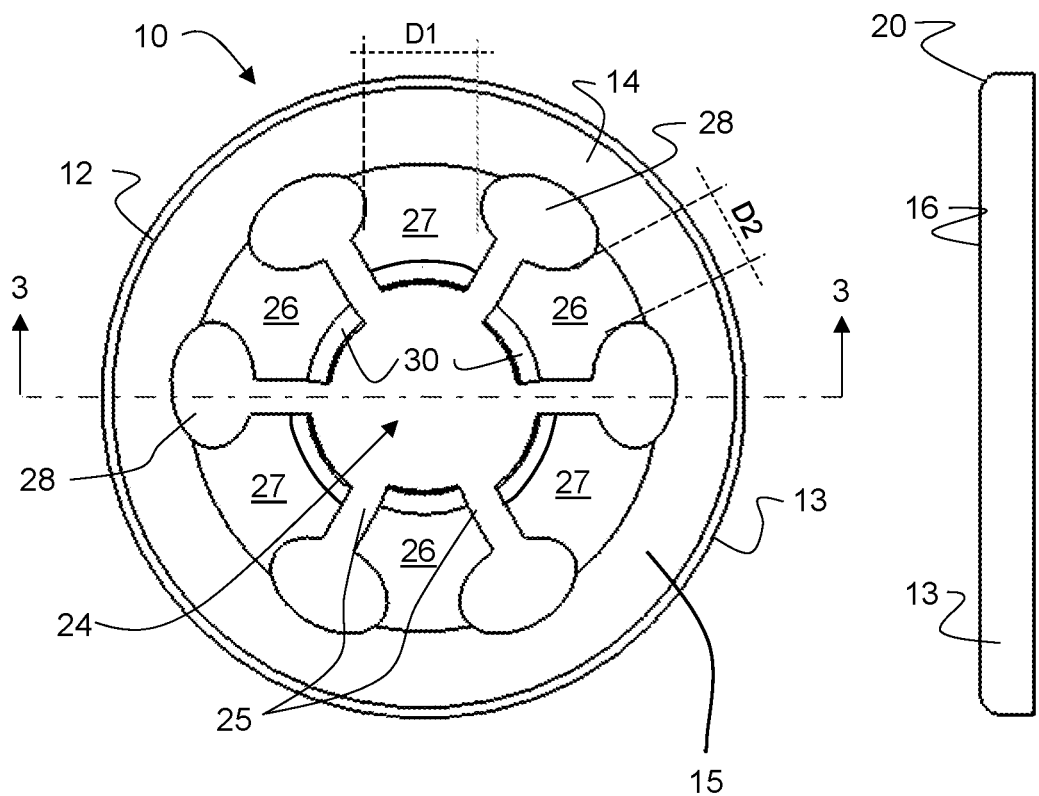
FIG. 1 illustrates a top view of the push-on fastener according to this disclosure.
Figure 2:
FIG. 2 illustrates a side elevational view of the push-on fastener according to this disclosure.

FIGS. 1 through 3 show the overall arrangement of a push-on type fastener 10 which incorporates the disclosure, and which generally comprises a circular, generally flat and relatively thin body 12 formed from a comparatively high strength sheet metal, such as spring steel. The body 12 includes a peripheral flange 13 extending about the outer edge of the body 12. The body 12 is provided with oppositely facing first exterior surface 14 and second exterior surface 16 and an outer marginal periphery 15. It should be noted that FIGS. 1 through 3 illustrate a body 12 having a circular peripheral flange 13, however, straight wall segments may also be used to form flange 13. For example, the flange 13 may be comprised of a plurality straight segments of equal lengths and angles forming various geometric shapes such as, for example, a decagon or a dodecagon.

The outer marginal periphery 15 extends to peripheral flange 13 which is formed integrally with the body 12. Flange 13 extends preferably perpendicular to the exterior surfaces of 14, 16. A relatively large radius 20, best seen in FIGS. 2 and 3, extends between the second exterior surface 16 and the associated peripheral flange 13.

Extending axially through the body 12 between the opposed exterior surfaces 14 and 16 is a central opening 24. The opening 24 is sized with relationship to a cylindrical stud to which the fastener may be applied in a manner to be described later in this disclosure. The opening 24 preferably has a generally circular configuration and has a first inner periphery and a second inner periphery that are each defined by a single and preferably a plurality of individual finger-like extensions or tabs that may have different lengths. Preferably, a first set of tabs 26 have lengths that are longer than a second set of tabs 27. Preferably, the first set of tabs 26 define the first inner periphery of opening 24. Preferably, a second set of tabs 27 are shorter in length than the first set of tabs 26 and define the second inner periphery of opening 24.

As best seen in FIG. 3, the tabs 26 and tabs 27 are deflected and inclined upwardly from the first exterior surface 14 and cooperate to define a somewhat conical shape about the opening 24. With renewed reference to FIG. 1, the individual finger-like tabs 26 and 27 are separated from one another by a slot 25. In this example embodiment, slots 25 are generally rectangular in shape, however, other shaped openings may be used and substituted for the rectangular slots 25, such as for example, an oval shaped slot.

Ovular recesses 28 may be fashioned from the slots 25 near the outer marginal periphery 15. The recesses 28 may remove material from the tabs 26, 27 to reduce the force necessary to deflect the tab. For example, recesses 28 may extend further into tab 27 than into tab 26. The recesses may be sized to provide a variable spring force to the tabs 26 and 27. This is done by offsetting the location of the recesses 28 to remove more material from the first set of tabs 26 and less material from the second set of tabs 27. Consequently, the first set of tabs 26 with less material may deflect more when subjected to a deflection force, than the second set of tabs 27 when the same deflection force is applied. As can be seen in FIG. 1, the distance D1 between recesses 28 defining tab 27 is greater than the distance D2 between recesses 28 that define tabs 26. Because tabs 27 have more steel spring material they are generally stiffer than tabs 26. It should be noted that the structures just described and shown in this disclosure are just one example for practicing the disclosure. It will be well understood by those skilled in the art, that any number of, or types of tabs 26 and 27 can be formed on the exemplary push-on fastener described herein, for example, such as triangular shapes. Additionally, The shapes of recesses 28 can be any manner of shape, and could be for example, square or triangular or any shape than can impart the function of providing the tabs with a greater or lesser degree of a spring type force.

The outer free ends of each of the finger-like tabs 26 and 27 are preferably provided with relatively sharp edges 30 which extend radially inward to a diametrically opposed location which is at least slightly smaller in diameter than the diameter of the stud on which the fastener is intended to be used.

It is important to note that the total height or deflected distance of the individual finger-like tabs 26 and 27 is such that they do not extend beyond the outer free end of the circumferentially extending peripheral flange 13 in this disclosure. Thus, the tabs 26 and 27 are generally located entirely within the outer envelope of the overall fastener body 12. That is, the finger-like tabs 26 and 27 are generally recessed within the flange 13. However, based on different installation requirements, such as for example, fitting the push-on fastener 10 on a stud having a greater diameter than the central opening 24, the finger-like tabs may be bent at a greater upward angle, which would allow the tabs 26 and 27 to extend outward of the outer free end of the circumferentially extending peripheral flange 18.

Figure 4:
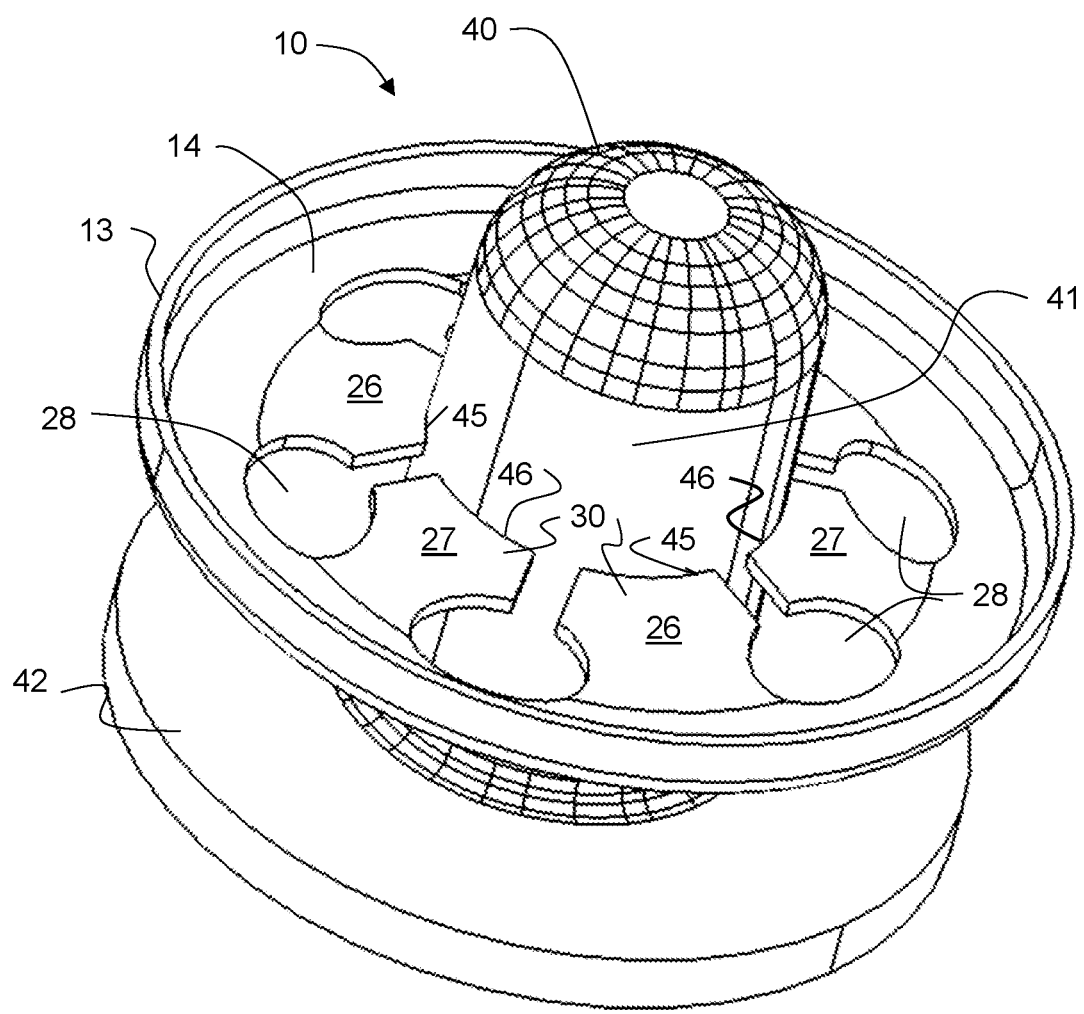
FIG. 4 illustrates an isometric view of the push-on fastener mounted on a stud, according to this disclosure.

FIG. 4 illustrates the fastener 10 of the present disclosure in use on a stud member 40. Merely by way of example and illustration, stud member 40 is a smooth surfaced cylindrical stud which extends from a subjacent support element 42 outwardly and has a component element 44. In this example, the stud member 40 is shown having a smooth external surface 41, however, the present disclosure can work equally as well on studs having external surface features such as threaded walls, ridges or other features that extend perpendicularly from the stud surface about its periphery. The fastener is moved into position on stud member 40 by aligning the central opening 24 over the stud 40 and imparting a downward force to the fastener 10. The the finger-like tab members 26 and 27 bend upwardly a slight distance creating gripping engagement between the corners 30 on the free ends of the tabs 26 and 27 and the exterior surface of the stud 40. Additionally, because tabs 26 are longer, and are less stiff than tabs 27, they engage the stud 40 at a first location 45 higher up on the exterior surface of the stud 40. Tabs 27 engage the exterior surface of the stud 40 at a second location 46 on the exterior surface of stud 40 that is lower than location 45. Therefore tabs 26 and 27 engage the stud 40 at two different locations on the stud surface to accommodate studs of different diameters or studs of a non-uniform diameter.

Any attempts to separate the components result in a camming or toggle-like action between corners 30 of the tabs 26 and 27 that increases the engagement and gripping of the stud 40. This particular type of locking engagement is standard with a push-on type fastener. With respect to the subject fastener, it should be noted that the peripheral flange 13 greatly strengthens the fastener 10 against bending and results in high strength even though manufactured from a relatively thin sheet metal.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A push-on fastener for engagement on a stud, the push-on fastener comprising:
   a body having oppositely facing first and second exterior surfaces and an outer marginal periphery;
   a central opening extending axially through the body between the oppositely facing exterior surfaces and defining an inner periphery;
   a first resilient tab including a first engagement edge and a second resilient tab including a second engagement edge, the first engagement edge defining the inner periphery of the central opening and the second engagement edge defining an outer periphery of the central opening that is outwardly of the inner periphery; and
   a recess extending between the first resilient tab and the second resilient tab near the outer marginal periphery, wherein the recess extends into the first resilient tab a greater distance than into the second resilient tab.

2. The fastener of claim 1, further comprising a slot extending axially between the first engagement edge of the first resilient tab and the second engagement edge of the second resilient tab to the recess.

3. The fastener of claim 1 wherein the first tab and the second tab are oriented at an angle from the marginal periphery.

4. The fastener of claim 3, wherein the outer periphery terminates in a flange extending along an edge of the outer periphery perpendicular to the first exterior surface.

5. The fastener of claim 1, wherein the fastener is composed of a spring steel.

6. A push-on fastener for engagement on a stud, the push-on fastener comprising:
   a body having oppositely facing first and second exterior surfaces and an outer marginal periphery;
   a central opening extending axially through the body between the oppositely facing exterior surfaces and defining an inner periphery;
   a first tab including a first engagement edge and a second resilient tab including a second engagement edge; and
   a recess extending between the first tab and the second tab near the outer marginal periphery, the recess extending into the first tab a greater distance than into the second tab,
   wherein the first tab being less resistant to deflection than the second tab causing the first engagement edge to engage the stud at a first location and the second engagement edge to engage the stud at a second location below the first location.

7. The fastener of claim 6, wherein the recess causes the second tab to be more resistant to deflection than the first tab.

8. The fastener of claim 6, wherein the first tab and the second tab are oriented at an angle from the marginal periphery.

9. The fastener of claim 8, further comprising a plurality of first tabs and a plurality of first engagement edges, each first engagement edge associated with a respective one of the plurality of first tabs the plurality of first engagement edges defining an inner peripheral diameter of the central opening that is smaller than the diameter of the stud.

10. The fastener of claim 9, further comprising a plurality of seconds tabs and a plurality of second engagement edges, each second engagement edge associated with a respective one of the plurality of second tabs the plurality of second engagement edges defining an outer peripheral diameter of the central opening larger than the diameter of the inner peripheral diameter.

11. The fastener of claim 10, wherein the first plurality of engagement edges engage the stud along the inner peripheral diameter at a first location on the stud and the second engagement edges engage the stud along the outer peripheral diameter at a second location on the stud when the stud is inserted into the central opening.

12. The fastener of claim 11, wherein the fastener is composed of a spring steel.

* * * * *